United States Patent [19]
Rissanen

[11] Patent Number: 5,378,294
[45] Date of Patent: * Jan. 3, 1995

[54] COPPER ALLOYS TO BE USED AS BRAZING FILLER METALS

[75] Inventor: Petri T. Rissanen, Pori, Finland

[73] Assignee: Outokumpu Oy, Espoo, Finland

[*] Notice: The portion of the term of this patent subsequent to Jan. 12, 2010 has been disclaimed.

[21] Appl. No.: 84,582

[22] Filed: Jul. 1, 1993

Related U.S. Application Data

[60] Continuation-in-part of Ser. No. 959,368, Oct. 13, 1992, abandoned, which is a continuation-in-part of Ser. No. 819,077, Jan. 10, 1992, Pat. No. 5,178,827, which is a division of Ser. No. 614,254, Nov. 15, 1990, Pat. No. 5,130,090.

[30] Foreign Application Priority Data

Nov. 17, 1989 [FI] Finland ............................ 895483

[51] Int. Cl.$^6$ ........................... C22C 9/02; C22C 9/06
[52] U.S. Cl. .................................. 148/433; 148/435; 420/472; 420/473; 420/485; 420/487
[58] Field of Search ................ 420/499, 493, 487, 485, 420/473, 472, 457; 148/435, 433

[56] References Cited

U.S. PATENT DOCUMENTS

| | | | |
|---|---|---|---|
| 4,209,570 | 6/1980 | Decristofaro et al. | 420/485 |
| 4,460,658 | 7/1984 | Bose et al. | 420/457 |
| 4,489,136 | 12/1984 | Bose et al. | 420/457 |
| 5,178,827 | 1/1993 | Rissanen | 420/472 |

FOREIGN PATENT DOCUMENTS

| | | | |
|---|---|---|---|
| 62-63633 | 3/1987 | Japan. | |
| 2168078 | 6/1986 | United Kingdom | 420/472 |

Primary Examiner—George Wyszomierski
Attorney, Agent, or Firm—Brooks Haidt Haffner & Delahunty

[57] ABSTRACT

The invention relates to low-nickel copper alloys to be used as brazing filler metals, which alloys also contain phosphorus, tin and possibly small amounts of manganese. The alloys are produced by means of atomization methods. Their advantages are low liquidus temperature and narrow mushy zone, high joint strength and good corosion properties. The alloys are cadmium free and economical in price and they are mainly used for brazing copper and its alloys.

5 Claims, No Drawings

COPPER ALLOYS TO BE USED AS BRAZING FILLER METALS

This application is a continuation-in-part of U.S. application Ser. No. 07/959,368, filed Oct. 13, 1992, now abandoned, which is a continuation-in-part of U.S. application Ser. No. 07/819,077, filed Jan. 10, 1992, now U.S. Pat. No. 5,178,827, which is a divisional of U.S. application Ser. No. 07/614,254, filed Nov. 15, 1990, now U.S. Pat. No. 5,130,090.

The present invention relates to low-nickel copper alloys to be used as brazing filler metals, which alloys also contain phosphorus, tin and possibly small amounts of manganese. The said alloys are produced by rapid solidification, RS. The advantages of these alloys are their low liquidus temperature, narrow mushy zone and high joint strength. These alloys are mainly used for brazing copper and its alloys.

Soldering is the term for joining metallic or ceramic parts of a workpiece by means of molten metal, i.e. filler metal, the melting temperature whereof is lower than that of the parts to be joined. The molten filler metal wets the surfaces of the parts to be joined, without melting them. When the working temperature of the filler metal is over 450° C., the respective term is brazing, and the filler metal is called brazing filler metal. The working temperature of filler metal is the lowest temperature, in which filler metal melts and wets a workpiece to be joined and where the filler metal spreads, flows and is bound to the basic material.

The working temperature of the brazing filler metal depends on its chemical composition. Pure metals have defined melting points, but with most metal alloys the transformation from solid to liquid state takes place within a certain mushy zone. The top limit of the sol id phase is called solidus, and the bottom limit of the liquid phase is called liquidus. Within the temperature range between these phase limits, the material is composed of a mixture of solid and liquid phase. In mass production, particularly in automatic brazing, the mushy zone of filler metal must be narrow, in order to minimize the time needed for brazing. In automatic brazing, the mushy zone of filler metal must be narrow, in order to minimize the time needed for brazing. In automatic brazing, the mushy zone of the filler metal must not be wider than 50° C. It is also beneficial that the working temperature of the brazing filler metal be low, because working time is costly.

Brazing filler metals can be produced by many different methods. A common feature of all RS methods is the high cooling rate of alloy, which is produced with the process, as well as the quenching of the melt into the final shape, without further reduction. Owing to the high cooling rate, the prepared alloy is more homogeneous both in composition and structure than a conventionally produced alloy. These methods enable the production of microcrystalline and even amorphous alloys, if the material composition is advantageous for the formation of an amorphous phase, and the cooling rate is high enough. The said methods are called RS (rapid solidification) methods.

The most commonly used additive in copper-based brazing filler metal is phosphorus, because then a separate flux is not needed in the brazing of copper. While the only alloying element employed is phosphorus, the melting temperature of the alloy remains fairly high. For eliminating this drawback, among others, silver, cadmium and phosphorus containing alloys have been developed. Among cadmium-bearing fillers let us mention for example BAg-1, the composition whereof is Ag38Cu21Zn22Cd19 (composition given in atomic percent), and the mushy zone 605°–650° C. Another silver-bearing brazing filler alloy is BCuP-5, the composition whereof is Ag9Cu80P11, and the mushy zone is 633°–680° C. These conventionally produced filler metals are well suited for brazing, but silver as an alloying element makes them expensive, and what is more the cadmium contained is toxic.

In order to replace silver and cadmium bearing brazing filler metals, there are developed alloys which, in addition to phosphorus, contain either nickel alone, or nickel and tin. The brazing filler metal Cu—Ni—P and its properties are described, among others, in U.S. Pat. No. 4,253,870. These alloys can be produced at least partly as amorphous by means of the RS method, when the alloy composition is within the area 5–40 atom percent Ni, 15–20 atom percent P, the balance being Cu and incidental impurities. The essential feature of the brazing filler metal is that it is at least partly amorphous in structure.

The use of tin as an alloying element lowers the melting temperature of the filler metal, so that the brazing can be carried out at a lower temperature than with the Cu—Ni—P brazing filler metal. The EP patent publication 103,805 relates to a Cu—Ni—Sn—P alloy produced by the rapid solidification method, the composition of the alloy being within the area 5–52 atom percent Ni, 2–10 atom percent Sn, 10–15 atom percent P, and the balance being copper.

In commercial production there are two of these alloys, i.e. Metglas 2002, the composition whereof is Cu74Ni10Sn2P14 (in atom percents), and the mushy zone 610°–660° C., and Metglas 2005, the composition whereof is Cu76Ni6Sn5P13, and the mushy zone 592°–655° C. The advantage of these filler metals is that their mushy zone is roughly equal to that of the brazing filler metal BAg-1, with a high silver content, but they are considerably more economical in price. It has been found out that these brazing filler metals have the lowest working temperature known so far, when copper is brazed without flux. Further lowering of working temperature is needed to avoid softening of copper alloys like zirconium copper during brazing. Lower working temperatures are achieved by lowering the melting temperature of the brazing filler metal.

According to the present invention there is now developed a Cu—Ni—Sn—P brazing filler alloy produced by the RS method, where the nickel content has been reduced, and consequently there are achieved lower working temperature, stronger joint and higher impact strength, owing to the reduced volume fraction of the fragile nickel phosphide phase. One benefit of brazing alloys is that brazing can be done without any extra flux resulting in better corrosion properties. The Ni content of the novel brazing filler alloy is within the range 0–5 atom percent, advantageously within the range 2.0–4.9 atom percent, the Sn content 0–15 atom percent, advantageously 1.5–12.0 atom percent, and the P content 5–20 atom percent, advantageously 8.0–16.5 atom percent.

The brazing filler alloy of the invention can also contain some manganese.

The powder-like product can be manufactured among others by atomization methods, Best suited for industrial production are the gas and water atomization methods. In the atomization method, brazing filler alloy, which is first melted in a ceramic crucible and then overheated, is sprayed through an orifice of a nozzle and dispersed into small droplets by spraying with quenching medium, gas or water. Medium grain size is typically 10–200μm and cooling rate at least 100 K/s, and typically $10^3$–$10^4$ depending on type of atomization method and process parameters like atomization pressure, diameter of orifice, melt overheat and melt properties. Water atomized powder is usually coarser than gas atomized powder.

Typical for atomized brazing powder is its chemical homogeneity resulting in a narrower mushy zone compared to conventionally cast alloy. The product of the present invention can be produced by means of the above described methods. The product cannot be produced by conventional casting and forming for the brittle nature of cast alloy.

The fine powder can be mixed with a binder in order to produce a paste especially suited for furnace brazing. Contact surfaces of parts to be brazed can be covered with a paste and parts can be brazed in one time after assembling. One example is brazing of a heat exchanger like a car radiator. A radiator brazed with the brazing filler metal of the present invention has higher strength, better duration in high temperature, better corrosion properties and higher cooling capacity compared to a conventional lead-tin soldered radiator.

The invention is further described by means of an example, where the now developed brazing filler metal is compared to some prior art products produced by the RS method. The example shows that the liquidus temperatue of new Cu—Ni—Sn—P alloys was up to 66° C. lower than the liquidus temperature of corresponding brazing filler alloys with a high nickel content. The tensile strengths were up to 90% higher than the tensile strengths of joints brazed with the prior art alloys. The highest tensile strengths were achieved with alloys which contained small amounts of manganese. The sur faces of brazed joints were smoother than those brazed with prior art alloys owing to lower content of phosphide phases and narrower mushy zone.

EXAMPLE

The table below presents first the composition and mushy zone as well as the ultimate tensile strength (UTS) of a copper-copper joints brazed with 12 different brazing filler powders of the present invention, and then the corresponding properties of the earlier mentioned brazing filler powders Metglas 2002 and Metglas 2005. The brazing filler powders of the present invention are produced by the gas atomization method. The mushy zone of the composition was defined by means of differential thermal analysis in argon atmosphere with the heating rate of 5 K/min.

In order to measure the ultimate tensile strength, butt joints of square oxygen free copper rods (K1E 10×10 mm) were brazed. The thickness of the filler metal layer was 0.1 min. The pieces to be joined were pressed slightly together in a fixture and then brazed in a tube furnace with argon flow. They were kept in the furnace for 15 minutes, 5 minutes of which time the pieces were at the brazing temperature. The brazing temperature ws 50° C. higher than the liquidus temperature of the alloy. It is worth noticing that the brazing with the alloys succeeded at lower temperatures, too.

In the tensile tests all brazed pieces were broken at the joint, wherefore the measured ultimate tensile strength (UTS) is the tensile strength of the brazed joint. The appended results show that the tensile strength of the brazed joints made by means of the alloys of the invention were up to 97% higher than those of the brazed joints made by means of the Metglas alloys. The liquidus temperatures of the alloys of the invention were lower allowing brazing at up to 66° C. lower temperature than the Metglas alloys. The mushy zone was narrower than that of Metglas alloys, e.g. the mushy zone of alloy No. 8 was 10° C.

TABLE

| Alloy No. | % | Cu | Ni | Mn | Sn | P | Mushy zone (°C.) | UTS (N/mm²) |
|---|---|---|---|---|---|---|---|---|
| 1 | at. % | 77.8 | 2.1 | — | 8.5 | 11.6 | 594– | 171 |
|   | wt. % | 76.9 | 1.9 | — | 15.6 | 5.6 | 622 |  |
| 2 | at. % | 78.4 | 3.2 | — | 8.6 | 9.8 | 584– | 181 |
|   | wt. % | 76.7 | 2.9 | — | 15.7 | 4.7 | 610 |  |
| 3 | at. % | 74.5 | 3.2 | — | 8.0 | 14.3 | 600– | 172 |
|   | wt. % | 75.0 | 3.0 | — | 15.0 | 7.0 | 627 |  |
| 4 | at. % | 76.0 | 3.2 | — | 8.4 | 12.4 | 583– | 174 |
|   | wt. % | 75.5 | 2.9 | — | 15.6 | 6.0 | 610 |  |
| 5 | at. % | 74.1 | 3.3 | — | 11.1 | 11.5 | 578– | 178 |
|   | wt. % | 71.6 | 2.9 | — | 20.1 | 5.4 | 601 |  |
| 6 | at. % | 73.5 | 4.3 | — | 7.9 | 14.3 | 580– | 176 |
|   | wt. % | 74.0 | 4.0 | — | 15.0 | 7.0 | 618 |  |
| 7 | at. % | 78.8 | 4.3 | — | 2.1 | 14.8 | 608– | 170 |
|   | wt. % | 83.8 | 4.2 | — | 4.3 | 7.7 | 629 |  |
| 8 | at. % | 76.0 | 4.9 | — | 8.3 | 10.8 | 584– | 185 |
|   | wt. % | 75.0 | 4.5 | — | 15.3 | 5.2 | 594 |  |
| 9 | at. % | 72.9 | 4.9 | — | 9.0 | 13.2 | 583– | 180 |
|   | wt. % | 72.4 | 4.5 | — | 16.7 | 6.4 | 606 |  |
| 10 | at. % | 75.99 | 4.9 | 0.01 | 8.3 | 10.8 | 583– | 190 |
|    | wt. % | 74.99 | 4.5 | 0.01 | 15.3 | 5.2 | 594 |  |
| 11 | at. % | 75.9 | 4.9 | 0.1 | 8.3 | 10.8 | 583– | 195 |
|    | wt. % | 74.9 | 4.5 | 0.1 | 15.3 | 5.2 | 595 |  |
| 12 | at. % | 75.51 | 4.9 | 0.49 | 8.3 | 10.8 | 580– | 197 |
|    | wt. % | 74.59 | 4.47 | 0.42 | 15.32 | 5.20 | 598 |  |
| 13 | at. % | 78.9 | 1.0 | — | 8.5 | 11.6 | 596– | 170 |
|    | wt. % | 77.8 | 0.9 | — | 15.7 | 5.6 | 626 |  |
| 14 | at. % | 71.5 | 3.0 | — | 14.5 | 11.0 | 582– | 175 |
|    | wt. % | 67.0 | 2.6 | — | 25.4 | 5.0 | 610 |  |
| 15 | at. % | 80.4 | 3.2 | — | 8.6 | 7.8 | 591– | 185 |
|    | wt. % | 77.8 | 2.9 | — | 15.6 | 3.7 | 615 |  |
| Metglas 2002 | at. % | 74.0 | 10.0 | — | 2.0 | 14.0 | 610– | 100 |
|  | wt. % | 78.8 | 9.9 | — | 4.0 | 7.3 | 660 |  |
| Metglas 2005 | at. % | 76.0 | 6.0 | — | 5.0 | 13.0 | 592– | 156 |
|  | wt. % | 78.2 | 5.7 | — | 9.6 | 6.5 | 655 |  |

I claim:

1. A brazing filler alloy powder having medium grain size of from 10 to 200 μm produced by means of an atomization method and to be used in brazing copper and copper alloys, said brazing filler alloy powder consisting essentially of about 1.0–4.9 atom percent Ni, 0–15 atom percent Sn, and 5–20 atom percent P, the balance being copper and incidental impurities, said alloy powder having a liquidus temperature not higher than about 629° C.

2. The powder of claim 1, wherein the Ni amount in the brazing filler alloy is within the range 2.0–4.9 atom percent, and the Sn content within the range 1.5–12.0 atom percent.

3. The powder of claim 1, wherein the Ni amount in the brazing filler alloy is within the range 2.0–4.9 atom percent, the Sn content within the range 1.5–12.0 atom percent and the P content within the range 8.0–16.5 atom percent.

4. A brazing filler alloy produced by an atomization method and to be used in brazing copper and copper alloys, said brazing filler alloy consisting essentially of at least 0–5 atom percent Ni, 0–15 atom percent Sn, 5–20 atom percent P, and 0.01–0.49 atom percent manganese, the balance being copper and incidental impurities.

5. The alloy of claim 4, wherein the alloy contains 0.1–0.49 atom percent manganese.

UNITED STATES PATENT AND TRADEMARK OFFICE
CERTIFICATE OF CORRECTION

PATENT NO. : 5,378,294
DATED : January 3, 1995
INVENTOR(S) : Petri T. Rissanen

It is certified that error appears in the above-indentified patent and that said Letters Patent is hereby corrected as shown below:

Column 1, line 36, "of the sol id" should read

--of the solid--.

Column 2, line 66, "methods, Best" should read

--methods. Best--.

Column 3, line 36, "The sur" should read

--The sur- --.

Column 4, line 42, "having medium" should read

--having a medium--.

Signed and Sealed this

Fourteenth Day of March, 1995

*Attest:*

BRUCE LEHMAN

*Attesting Officer*  *Commissioner of Patents and Trademarks*